J. FAWELL.
MANIPULATOR FOR FEED TABLES FOR ROLLING MILLS.
APPLICATION FILED MAY 7, 1908.

915,669.

Patented Mar. 16, 1909.
8 SHEETS—SHEET 1.

WITNESSES:
J. Herbert Bradley.
Francis J. Tomasson

INVENTOR
Joseph Fawell.
by Christy & Christy, Atty's

J. FAWELL.
MANIPULATOR FOR FEED TABLES FOR ROLLING MILLS.
APPLICATION FILED MAY 7, 1908.

915,669.

Patented Mar. 16, 1909.
8 SHEETS—SHEET 6.

WITNESSES:

INVENTOR

J. FAWELL.
MANIPULATOR FOR FEED TABLES FOR ROLLING MILLS.
APPLICATION FILED MAY 7, 1908.

915,669.

Patented Mar. 16, 1909.
8 SHEETS—SHEET 8.

WITNESSES:

INVENTOR
Joseph Fawell

UNITED STATES PATENT OFFICE.

JOSEPH FAWELL, OF PITTSBURG, PENNSYLVANIA.

MANIPULATOR FOR FEED-TABLES FOR ROLLING-MILLS.

No. 915,669.   Specification of Letters Patent.   Patented March 16, 1909.

Application filed May 7, 1908. Serial No. 431,388.

*To all whom it may concern:*

Be it known that I, JOSEPH FAWELL, residing at Pittsburg, in the county of Allegheny and State of Pennsylvania, a citizen of the United States, have invented or discovered certain new and useful Improvements in Manipulators for Feed-Tables for Rolling-Mills, of which improvements the following is a specification.

The invention described herein relates to certain improvements in ingot manipulators for rolling mill feed tables, and has for its object the arrangement and combination of such portions of the manipulators and their operating mechanisms, as would be injuriously affected by scale, etc., in such positions that the scale cannot fall on them in the rolling operation or usual operation of the mill.

It is a further object of the invention to so combine and arrange the parts of the feed table and manipulating mechanism that one will not interfere with the repair or renewal of parts of the other.

The invention is hereinafter more fully described and claimed.

Figure 1:
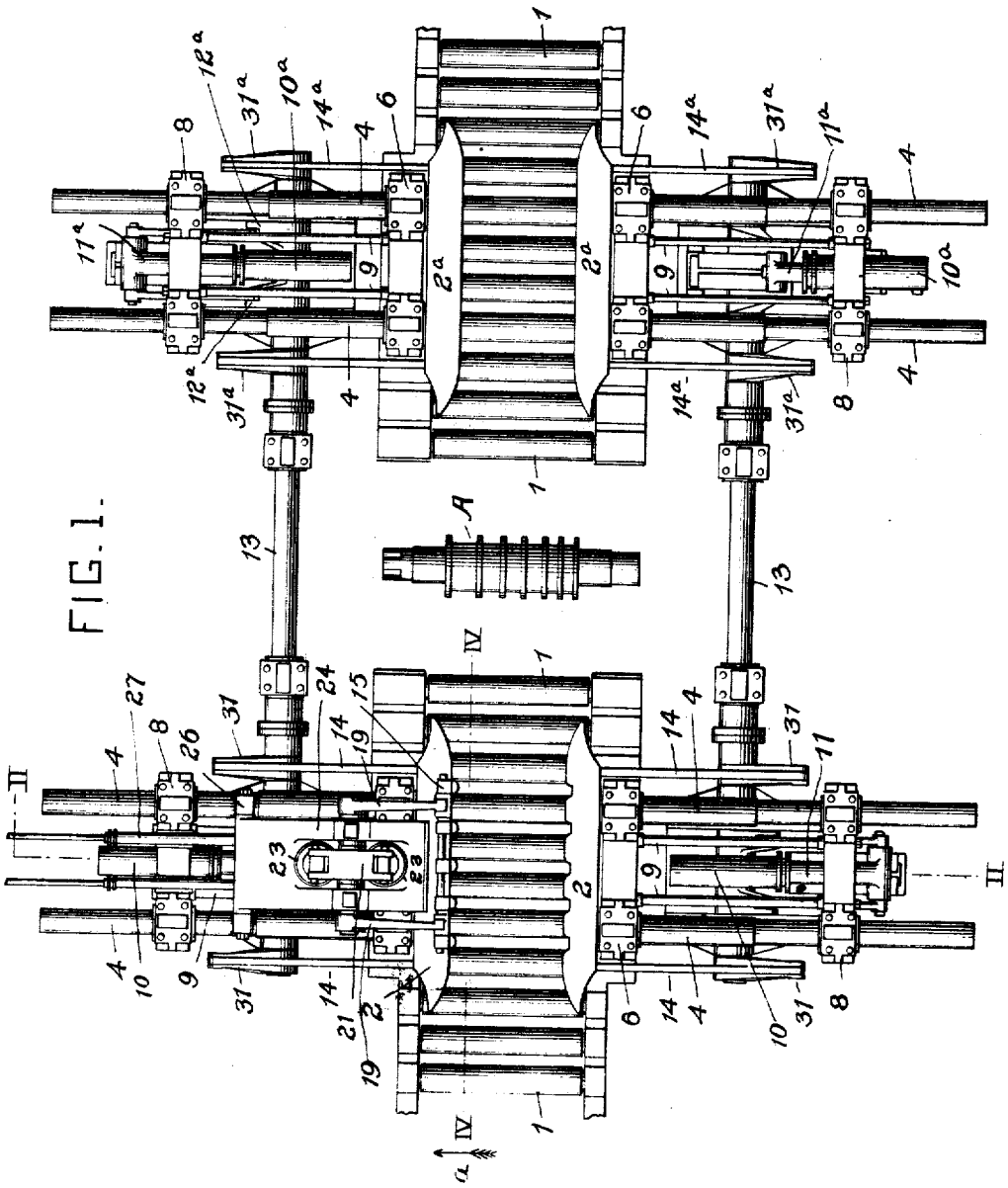
Figure 2:
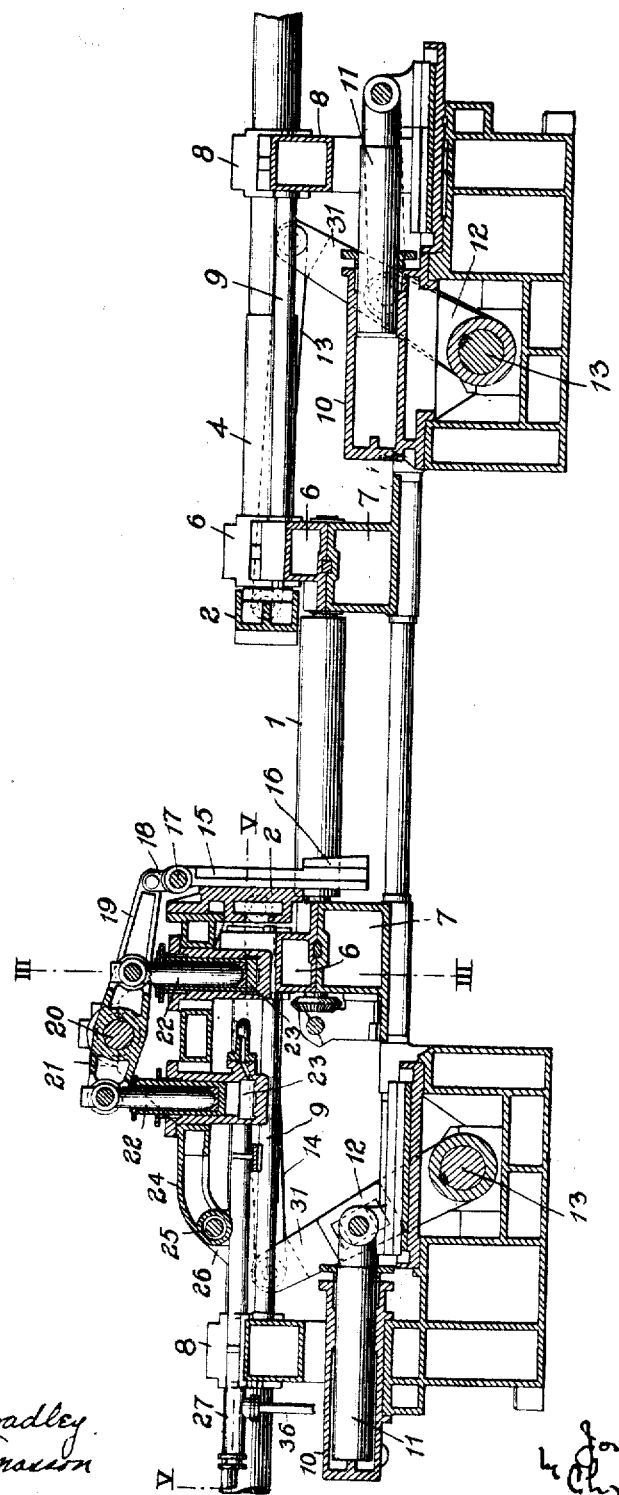
Figure 3:
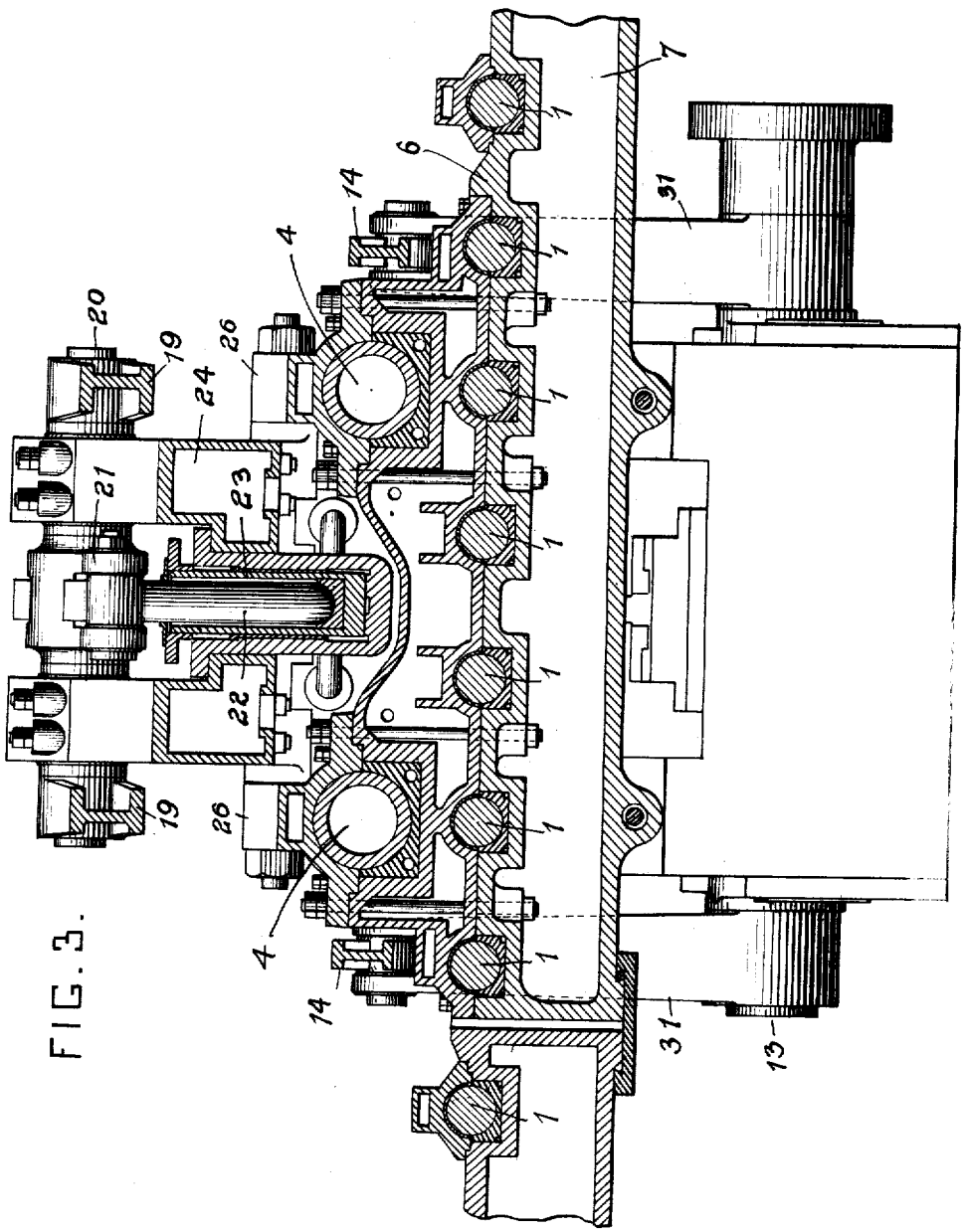
Figure 4:
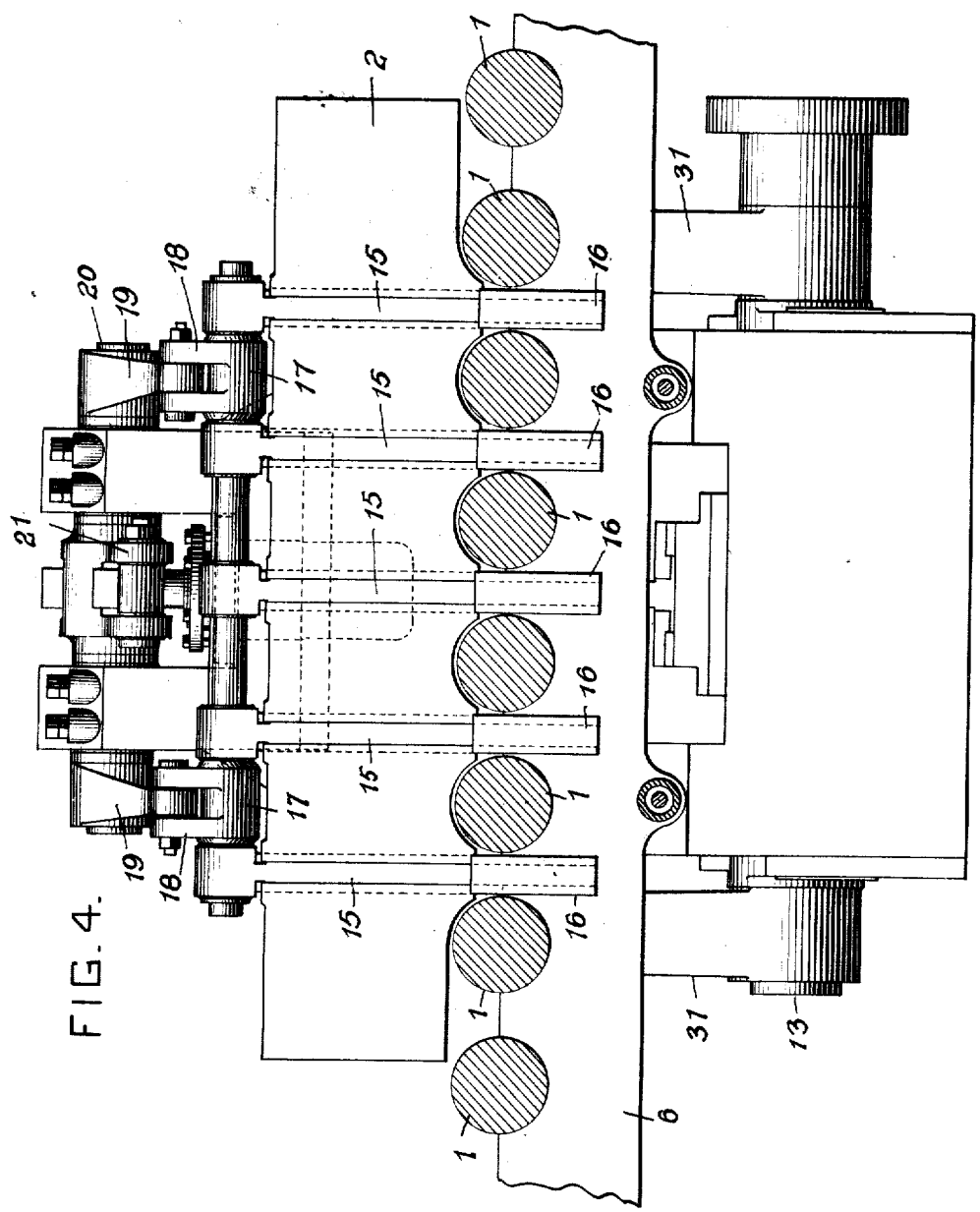
Figure 5:
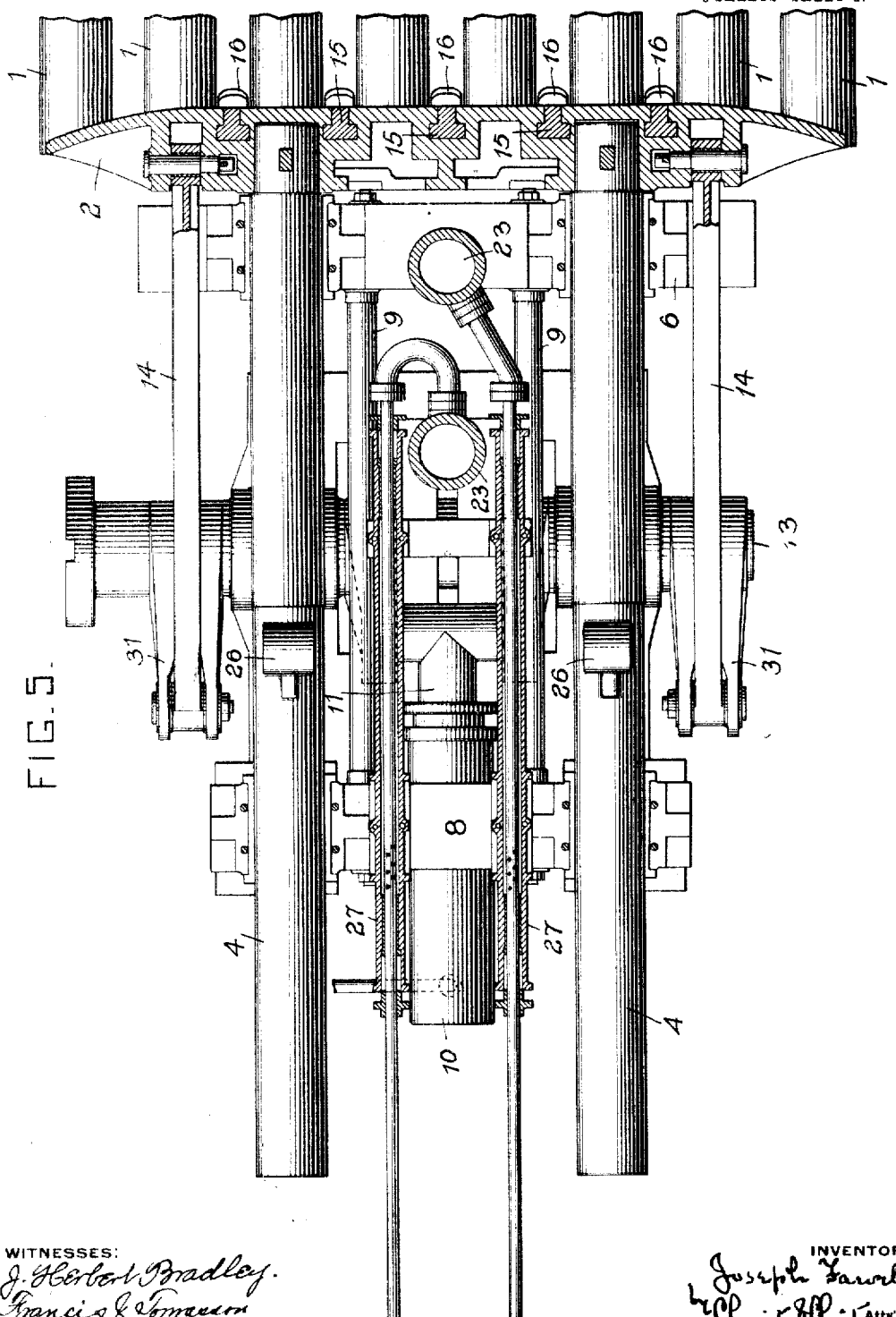
Figure 6:
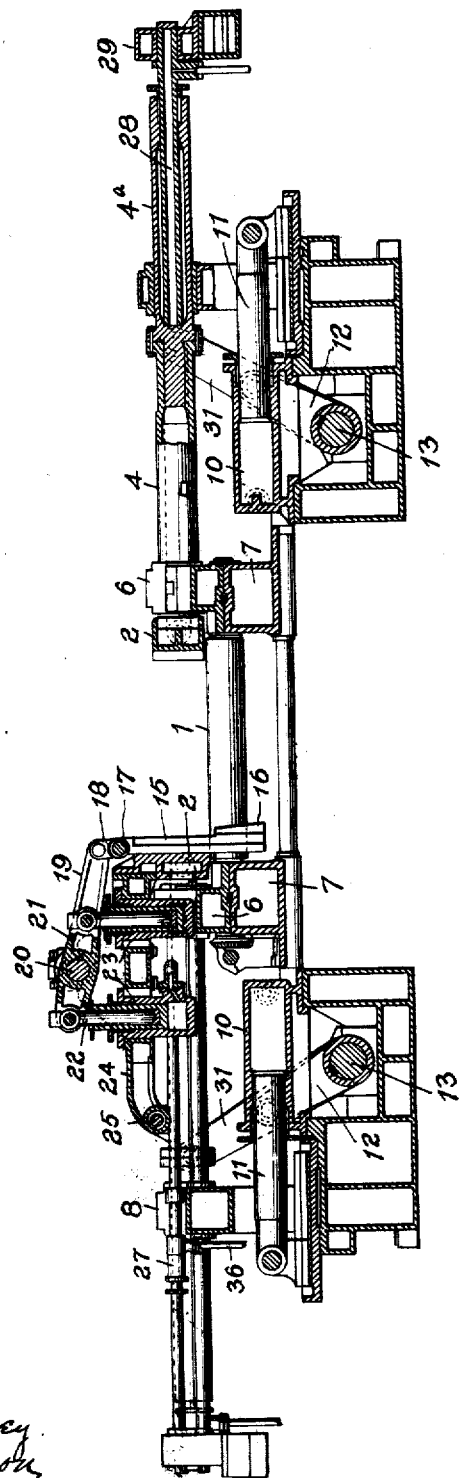
Figure 7:
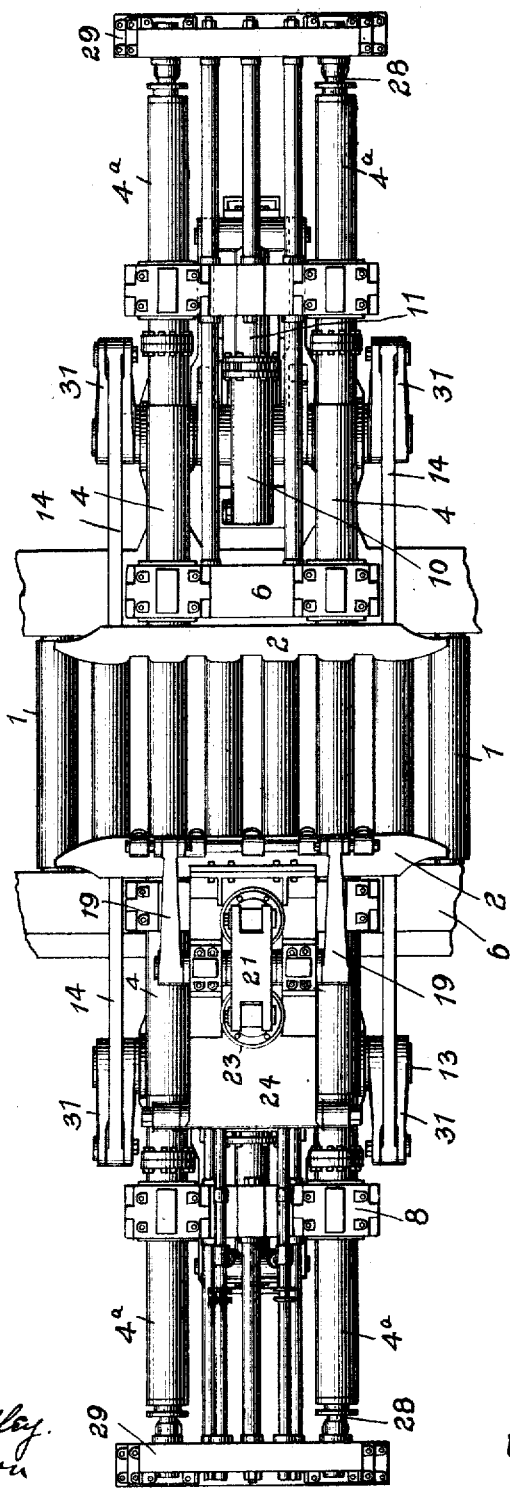
Figure 8:
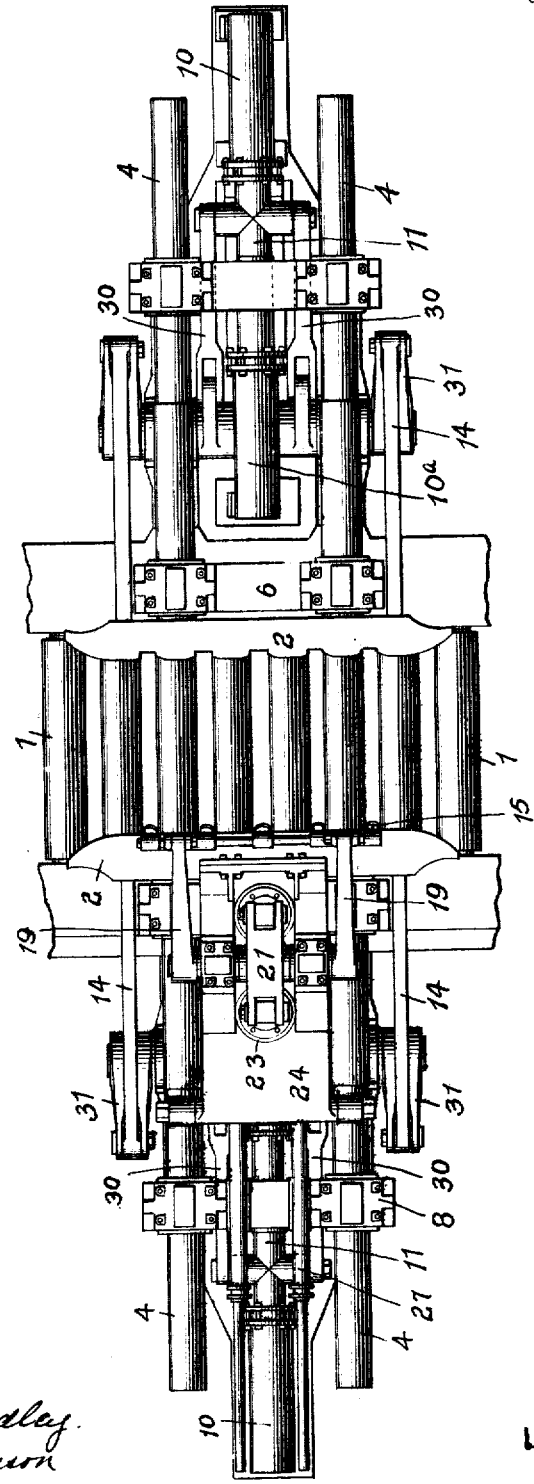

In the accompanying drawings forming a part of this specification Figure 1 is a top plan view showing portions of the feed table and the manipulating mechanisms on the opposite side of a mill; Fig. 2 is a sectional elevation of the same, the plane of section being indicated by the line II—II Fig. 1; Fig. 3 is a sectional elevation on a plane indicated by the line III—III Fig. 2; Fig. 4 is a sectional elevation on a plane indicated by the line IV—IV Fig. 1, looking in the direction of the arrow *a;* Fig. 5 is a sectional plan view on a plane indicated by the line V—V Fig. 2; Fig. 6 is a view similar to Fig. 2, illustrating a modification of my improvement; Fig. 7 is a top plan view of the construction shown in Fig. 6, and Fig. 8 is a view similar to Fig. 7, illustrating a further modification.

In the practice of my invention, the feed table as regards the feed rollers 1 and their operating mechanism, is constructed in the usual or any suitable manner. Heads or abutments 2 are supported above the plane of the feed rollers and at right angles thereto by guides 4 preferably tubular and having bearings in blocks 6 arranged above and in line with the side frames 7 of the feed table. It is preferred that these blocks 6 should be formed integral with the caps for the bearings of the journals of the feed rollers 1, or for as many thereof as are spanned by the head or abutment as clearly shown in Fig. 3. These guide members 4 are preferably tubular and extend back and have bearings in a frame 8 arranged parallel with side frames 7 of the feed table, and preferably tied thereto by rods 9. The bearing blocks 6 and the frames 8 should be spaced a distance apart sufficient to form a firm and steady support for the guide rods of the abutments or heads. By thus supporting the heads or abutments by bearings above the planes of the rollers, there will not be any liability of the guides or their bearings to be cut by scale, etc. These heads or abutments are shifted transversely of the feed table by a suitable mechanism, preferably by means of fluid pressure cylinders 10 having their ram or piston 11 connected to an arm 12 which is secured to a shaft 13. The upper ends of arms 31 also on shaft 13 are connected by links 14 to the heads or abutments. When manipulators are desired on both sides of the mill, the shaft 13 is extended past the mill, as shown in Fig. 1 and provided with arms 31ª connected by links 14ª to the heads 2ª on the further side of the mill. In such construction the cylinder 10 on one side of the mill will be of a single acting character and adapted to rock the shaft and shift the heads in one direction while the reverse movement of the shaft and heads will be effected by a corresponding cylinder 10ª and ram 11ª on the opposite side of the mill, as will be seen by reference to Fig. 1. By this construction the two heads will be moved simultaneously and equally transversely of the table.

As clearly shown in Figs. 1 and 2, two shifting heads or abutments arranged in line with each other across the table so that the ingot can be shifted in either direction transversely of the table to bring it into alinement with the desired pass in the reducing rolls A. The heads are similarly constructed and operated as regards the performance of the ingot shifting function when the feed tables on both sides of the mill are provided with manipulators, synchronous and equal movements of the members of both pairs of heads is attained by means of the connecting shafts 13.

In order to effect an axial turning of the ingot, one or more of the heads are provided with grooves in their vertical faces for the reception of turning bars 15, which, as shown in Fig. 2, are provided with shoulders 16 adapted to engage one edge of the ingot lying on the rollers. These turning bars have their upper ends connected by means of a shaft 17 and links 18 to rocker arms 19 on shaft 20. This shaft is also provided with rocker arms 21 connected at their outer ends to rams 22 of the fluid pressure cylinders 23, and by the alternate operation of these fluid pressure cylinders the turning bars are raised and lowered as required. The cylinders 23 are supported on a platform 24 secured at one end of the head or abutment 2 while the opposite end is supported by a shaft 25 having its ends secured in lugs 26 on the guides 4, as clearly shown in Figs. 1 and 2. As this platform carrying the cylinders 23 is secured to the head 2, or parts movable therewith, the ingot turning cylinders will be moved simultaneously and equally with the head. In order to supply fluid pressure to the cylinders 23 supply pipes 36 having telescopic portions are connected to the cylinders. One member of the telescopic portions, as the sleeve 27, is secured to the frame 8 and connected to the supply pipe 36 while the other member passes through the sleeve 27 and is connected to one of the operating cylinders 23.

As shown in Figs. 6 and 7, the tubular guides 4ª may be made in the form of cylinders having rams 28 fitting therein and connected to a stationary abutment 29, so that these guide cylinders will operate to move the head inwardly to shift an ingot across the rolls, while the return movement will be effected by a cylinder 10, connected as heretofore described to the shifting head. This construction is especially desirable where manipulating devices are used on one side of the mill only, but may be used when two sets of manipulating mechanisms are employed as in Fig. 1, synchronous movements of the heads on both sides of the mill will be insured by the connecting shaft 13, and in such case the cylinder 10 and its ram are omitted, their functions being performed by the cylinders 4ª and their rams.

As shown in Fig. 8 the construction shown in Fig. 1 may be modified by arranging the cylinders 10 and 10ª in tandem their rams being connected by links 30 to the arms 12 on shaft 13.

It is characteristic of my improvement that the heads or abutments are supported by guide rods which are entirely above the plane of the feed rollers and that the bearings for these guides are outside of vertical planes coinciding with the ends of the operative portions of the rollers.

I claim herein as my invention:

1. A feed table for rolling mills having in combination therewith a head or abutment, movable in directions parallel with the axes of the feed rollers to shift an article resting on the latter, horizontal guides carrying the head or abutment and extending laterally from the feed table, turning bars movable with the head, a platform carried by the guides and a motor carried by the platform for operating the turning bars.

2. A feed table for rolling mills having in combination therewith a head or abutment, guides extending horizontally in planes above the feed rollers and carrying the head or abutment, turning bars movable with the head, a platform carried by the guides and a motor carried by the platform for operating the turning bars.

3. A feed table for rolling mills having in combination therewith a head or abutment movable transversely of the table, guides carrying the heads and extending horizontally, and bearings for said guides arranged above carried by and in substantial alinement with the side frame of the table.

4. A feed table for rolling mills having in combination therewith a movable head or abutment, horizontal guides carrying the heads and bearings for said guides carried by the caps of the bearings for the rollers of the feed table.

5. A feed table for rolling mills having in combination therewith a movable head or abutment, horizontal guides carrying the heads vertically movable turning bars carried by the head, fluid pressure cylinders carried by the guides and connections from the cylinders to the turning bars.

6. A feed table for rolling mills having in combination therewith horizontally arranged fluid pressure cylinders movably supported in bearings on the side frames of the feed table and having stationary pistons or rams and a head or abutment carried by said cylinders.

7. A feed table for rolling mills having in combination therewith a head or abutment, guides carrying the head or abutment and supported at points outside of a vertical plane coniciding with the ends of the operative portions of the feed rollers, and above said rollers, a rock shaft having arms connected to the head, and fluid pressure cylinders for oscillating the rock shaft.

8. A feed table for rolling mills having in combination therewith, a head or abutment, guides carrying the head or abutment and movably supported at points outside of vertical planes coinciding with the ends of the operative portions of the feed rollers, turning bars carried by the head, means carried by the guides for shifting the turning bars, and means for reciprocating the head.

In testimony whereof, I have hereunto set my hand.

JOSEPH FAWELL.

Witnesses:
FRANCIS E. FAIRMAN,
CHARLES BARNETT.